Figure 1:
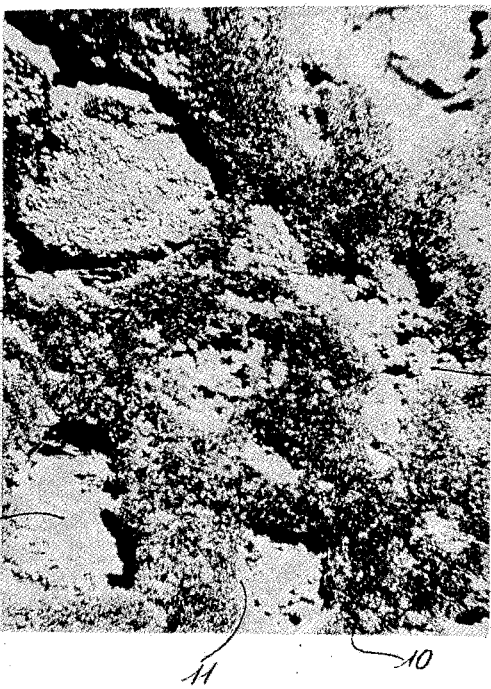

Nov. 15, 1938.   L. G. JENNESS   2,136,509
CATALYST PELLET AND PROCESS OF MAKING
Filed Nov. 14, 1935

Inventor
Leslie G. Jenness
Bacon & Thomas
Attorneys

Patented Nov. 15, 1938

2,136,509

UNITED STATES PATENT OFFICE 2,136,509

CATALYST PELLET AND PROCESS OF MAKING

Leslie G. Jenness, Brooklyn, N. Y.

Application November 14, 1935, Serial No. 49,793

4 Claims. (Cl. 23—233)

This invention relates to catalysts and more particularly to a process of making catalyst pellets which have great mechanical strength and which do not disintegrate under conditions of operation.

The catalyst pellets of the present invention have particular utility for catalytic reactions in the gaseous phase at a relatively high temperature but are of general application wherever a catalyst pellet is required.

An object of the present invention is to provide a catalyst pellet having great mechanical strength without impairment of the activity of the catalytic material.

Another object of the invention is to provide a process of making catalyst pellets which will not disintegrate when employed in gaseous phase catalytic reactions.

Another object of the invention is to provide a process of making catalyst pellets having high heat conductivity and catalytic activity.

Another object is to provide a process of making a catalyst pellet having a metallic skeleton with catalytic material diffused thereinto and present as solid inclusion or as a coating upon the surface of pores in the skeleton.

Another object of the invention is to provide a process of sintering a compressed mixture of metallic powder and powdered catalytic oxide for making a porous catalyst pellet having high mechanical strength.

Another object of the invention is to provide a catalyst pellet having great mechanical strength and catalytic activity.

A further object of the invention is to provide a malleable catalyst pellet having good heat conductivity.

A further object of the invention is to provide a porous catalyst pellet having a metallic skeleton formed of an alloy of a catalytic metal and another metal.

A still further object of the invention is to provide a sintered catalytic pellet having a metallic skeleton with catalytic material diffused thereinto and present as solid inclusions or as a coating upon the surface of pores in the skeleton.

Other objects and advantages of the invention will appear in the following description of the preferred process of making such catalyst pellets and the pellet produced thereby.

The process contemplated by this invention comprises, in general, the mixing of a finely divided catalytic oxide or other reducible compound of a desired catalytic metal with a finely divided metal, compressing this mixture into pellets, and then sintering the pellets in a reducing atmosphere. During the sintering operation, the compound is at least partially reduced. The temperature of sintering must be sufficient to cause the metal from the reduced compound to diffuse into the small metal particles originally compressed with the oxide. Under properly controlled conditions, the reduction of the metallic compound causes a local shrinkage of the catalytic material to form pores in the catalyst pellet, and the metal resulting from the reduced oxide diffuses into the finely divided metal and alloys therewith to form a metallic skeleton with solid inclusions of catalytic material therein and with coatings of catalytic material upon the interior of the pores.

Sufficient finely divided metal is employed to form a continuous metallic skeleton of considerable mechanical strength and which is malleable and has good heat conducting properties. Because of the porous nature of the pellet and the fact that the catalytic material in either oxide or metallic form or both is present as solid inclusions in the skeleton or on the walls of the pores, contact between gases being subjected to catalytic reactions and the catalyst is promoted, and the pellets are extremely active catalytically.

Figure 2:
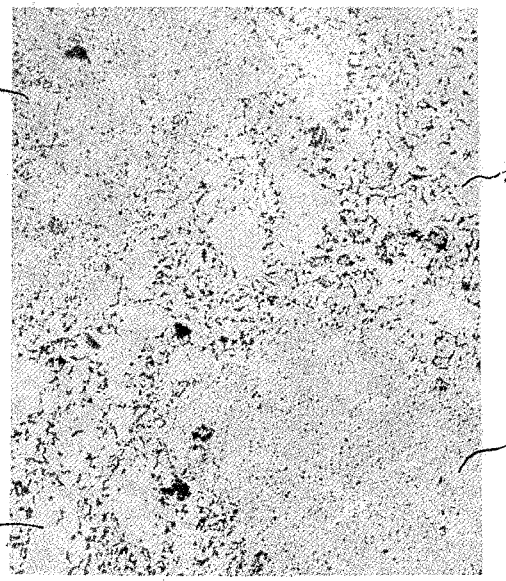

The attached drawings are micro-photographs illustrating the structure of a finished pellet produced by the present invention. For purposes of illustration, a pellet made from nickel oxide and copper powder in accordance with the first specific example hereinafter given has been selected. In the drawing:

Fig. 1 is a polished section of such a pellet taken parallel to the force employed to compress the powdered material in forming the pellet and photographed under diffused light at a magnification of 50 diameters, and Fig. 2 is a more highly polished section taken normal to the force employed in forming the pellet and photographed at a magnification of 200 diameters.

The surfaces of the sections in both micro-photographs were not etched but were photographed in their polished condition. The metallic skeleton is shown at 10 in both figures. This skeleton comprises a solid solution or alloy of copper and nickel and, in general, is richer in copper than nickel. The color of the skeleton is, however, white when visually inspected under the microscope which indicates that it contains considerable proportions of nickel, although in some instances copper rich areas of the skeleton have a distinct reddish tinge. It is to be noted that the skeleton 10 forms a continuous metallic structure throughout which there are inclusions of catalytic material. By the term "inclusions", as employed in this specification, I mean the catalytic active material which is coated on the walls of the skeleton as at 11 in Fig. 1, or solid inclusion as at 12 in Figs. 1 and 2. These inclusions in the nickel oxide and copper powder pellets are primarily nickel which is catalytically active for the reaction for which the particular pellets shown are intended, but may in some instances contain unreduced nickel oxide which for certain reactions is also catalytically active. It is thus apparent that all of the nickel does not enter into the solid solution of the skeleton.

The section shown in Fig. 2 which was taken in a plane normal to the force of compression employed in originally compressing the pellet and thus parallel to any strata which might be formed during compression, discloses a structure in which no large voids are present and in which the inclusions substantially fill the pores or cavities in the skeleton. However, the section of Fig. 1, taken parallel to such force of compression, does show relatively large cavities not entirely filled with inclusions. Considerable difficulty was encountered in polishing such sections and it may be that these cavities were originally substantially filled with included material which was dislodged during polishing. In any event both micro-photographs show the presence of a metallic skeleton in which are present inclusions of catalytic material. It is, of course, apparent that the metal of the skeleton, as well as the included material, may be catalytically active in a desired reaction. This continuous alloy skeleton formed of particles of metal autogenously bonded together in a solid solution is entirely dissimilar from structures in which particles are held together by mechanical deformation as by pressure alone, or structures held together by various binding agents and also from structures produced by sintering masses of loose particles.

The final pellet of the present invention is extremely strong mechanically and has a hard outer surface resistant to abrasion. It is, however, easily permeable by gases. For example, a considerable quantity of air or other gas can be passed entirely through the body of the pellet in any direction by a relatively low gas pressure.

In general, a finely divided metal other than that of the metallic compound is employed in producing such pellets. Since the metallic skeleton is formed as the result of diffusion of some of the reduced catalytic metal into the metallic particles originally compressed with the oxide and since different metals will allow this diffusion to take place at different temperatures, the metal selected for a given pellet is of great importance.

For example, by using nickel oxide as the catalytic oxide and finely divided iron as the other metal, the nickel reduced from the oxide will diffuse into the iron particles at a temperature of 550° to 575° C. If copper is employed as the other metal with nickel oxide, the sintering temperature is approximately 750° C., while if finely divided nickel be employed with nickel oxide, the desired skeleton will not be formed without sintering at a relatively high temperature near the melting point of the nickel. For the majority of cases, therefore, it is desirable to select a different metal from that common to the catalytic oxide. Other examples of combinations of metals and metal oxide are copper oxide as the catalytic oxide and either iron or nickel as the finely divided metal. Also iron oxide may be employed with finely divided nickel or copper. When copper powder is employed in this combination, the sintering point is approximately 600° C. Many other suitable combinations of oxides or other reducible compounds such as nickel chromite with finely divided metal can be employed.

In selecting the finely divided metal for compressing with a catalytic oxide or oxide of a catalytic metal, the temperature at which the catalyst pellet is to be employed must be considered. It is, of course, desired to select a metal which will allow diffusion of the metal resulting from reduction of the oxide into it at a relatively low temperature in order to facilitate the formation of pellets. However, the temperature at which diffusion takes place and the skeleton is formed should be above that at which the catalyst pellet is to be used so that the pellet may be formed at the higher temperature but further diffusion will not take place at the temperature of the catalytic reaction.

I have found that the ratio of oxide to powdered metal is of considerable importance. The best pellets result when there is only sufficient quantity of the powdered metal present to form the skeleton, thus having as much catalytic material present as possible. If insufficient finely divided metal is present, the skeleton will not form and the pellets will be soft and powdery. If an excess of the finely divided metal is present, the pellets will tend to become dense and less porous, and their catalytic activity will be impaired. In general, the preferred range of metallic powder is between 40% and 60%, and in most cases 50% has given the best results. It will be appreciated that this range will vary somewhat with different metallic compounds and different finely divided metals. In general, less than 40% metallic powder will result in a pellet which is very weak and which will disintegrate in gaseous phase catalytic processes in a relatively short time. Also, the more finely divided metal which is added to the pellet, the greater will be the mechanical strength of the pellet. However, as already indicated, above approximately 60% finely divided metallic powder produces a pellet which is quite dense and of somewhat impaired catalytic activity. It is to be noted, however, that in certain operations wherein the operating conditions require an extremely strong pellet, it may be desirable to sacrifice some of the catalytic activity in the interest of producing an extremely strong pellet.

As above indicated, the sintering operation is carried on in a reducing atmosphere at a temperature sufficient to reduce at least a portion of the oxide and to cause the resulting metal therefrom to diffuse fairly rapidly into the powdered metal particles. Any reducing gas which does not have a deleterious effect upon the catalytic properties of the pellet may be employed. Hydrogen may be employed for this purpose, or if the gases with which the pellet is to be used are of reducing nature, they may be employed to produce the reducing atmosphere.

For example, a catalyst to be employed for the conversion of a hydrocarbon gas in the presence of steam into hydrogen and carbon dioxide might be reduced with a mixture of the hydrocarbon gas and steam. The temperature selected for the sintering operation will depend upon the catalytic oxide and metal employed, as discussed above. In general, the pellets should be treated in the reducing atmosphere for a period of time ranging from 12 to 48 hours at the temperature necessary to cause reduction and sintering. The temperature should not materially exceed that necessary to cause the sintering of the two metals since higher temperatures will cause the pellet to become more dense. The length of time required for sintering will also depend upon the relative amount of oxide which it is desired to reduce to metallic form.

Any catalytic oxide or compound which can be reduced to metallic form and which can be caused to diffuse into the finely divided metal is within the contemplation of this invention. Because of their extreme activity and peculiar adaptability to the present process, I prefer to use the foraminated catalytic oxides prepared according to my Patent No. 1,937,489, patented November 28, 1933, and more particularly the foraminated catalyst disclosed in my pending application Serial No. 13,972, filed March 30, 1935. The particular metallic oxide or other compound employed for a particular catalyst will be determined by the reaction with which is is desired to employ the catalyst. For example, nickel oxide is suitable for catalyst pellets intended for the conversion of hydrocarbons to hydrogen and carbon dioxide, and such pellets are also suitable for many hydrogenation processes. For certain other hydrogenation processes, copper oxide is the metallic oxide employed for making the catalyst pellets. For dealkylation reactions, and the production of synthetic ammonia, iron oxide is employed for making the catalyst pellets. Other catalytic oxides or other reducible compounds may be employed in making pellets for other catalytic reactions.

*Example I*

As a specific example of catalytic pellets for converting hydrocarbons into hydrogen and carbon dioxide, a catalytic nickel oxide prepared by leaching a precipitated and dried aggregate consisting of approximately $6NiO:CrO_3$, as disclosed in my copending application Serial No. 13,972 above mentioned, was employed. This oxide was of 200-mesh particle size and was employed with an equal amount by weight of 100–150-mesh metallic copper. The nickel oxide and finely divided copper was thoroughly mixed in a dry form and compressed into circular pellets about ½ inch in diameter and ¼ inch in thickness. A Stokes pellet machine was used for this purpose, the force of compression being in the direction of the minor dimension of the resultant pellet. A continuous feed of mineral lubricating oil was delivered to the plunger to act as a lubricant, which lubricating oil mixed with the mixture being compressed and aided in binding the materials together in forming the pellets. However, it has been found that such lubricating oil is not necessary, and the pellets may be compressed dry in suitable apparatus.

Approximately 700 pounds of these pellets were then charged into a metallic tower 15 inches in diameter and 7 feet tall which was enclosed in an electric heating jacket. The tower was equipped with temperature recording devices positioned in the mass of pellets so that the temperature therein could be determined. The temperature was brought up to approximately 750° C., and a mixture of propane and steam was then passed through the tower at a rate of 2½ lbs. and 25 lbs. per hour, respectively. A period of about 48 hours was required for reduction and formation of the pellets. The temperature of the desired catalytic reaction in which these pellets were to be employed was from 500° to 550° C., and it will be noted that the temperature of formation of the pellets was considerably higher than this.

The apparatus in which the pellets were formed is also suitable for the conversion of hydrocarbon gas and steam into hydrogen and carbon dioxide. In this particular case, the formed pellets were allowed to remain in the tower, the temperature was dropped to between 500° and 550° C., the propane and steam velocities were increased, and the conversion of propane to hydrogen and carbon dioxide was conducted in the same apparatus. The pellets were found to be very active catalytically, such that large quantities of the hydrocarbon gas could be converted into hydrogen and carbon dioxide with a very small amount of residual hydrocarbon and formation of carbon monoxide. This conversion was carried out over an extended period of time, and no mechanical or catalytic break-down of the pellets took place.

*Example II*

As another specific example, approximately equal parts by weight of metallic iron and the catalyst above referred to were mixed in a dry state and compressed into pellets in a Stokes pellet machine. The procedure in making the pellets was exactly the same as in the above example except that the reduction and sintering treatment was carried out at a temperature of 575° to 600° C., which was sufficiently high to cause reduction of the nickel oxide and diffusion of resultant nickel into the iron particles. These pellets were also found to be mechanically strong and catalytically active at the temperatures required for the conversion of hydrocarbons into hydrogen and carbon dioxide.

While I have disclosed the preferred embodiment of my invention, it is to be noted that the method of forming the catalytic pellets herein disclosed is applicable to a wide variety of catalysts, and the pellets themselves are applicable to a wide variety of catalytic processes, and it is understood that the invention is not to be limited to the details herein disclosed but may be varied within the scope of the following claims.

Having thus described the invention, what I claim is:

1. The method of making catalyst pellets which comprises, mixing a finely divided reducible oxide of a catalytic metal with another metal in finely divided form, said oxide being reducible at a temperature lower than the sintering temperature of said other metal, said other metal being employed in an amount between approximately 40 and 60% by weight of the resultant mixture, compressing the resultant mixture into pellets, heating said pellets in a reducing atmosphere to a temperature sufficient to reduce said oxide and cause catalytic metal to diffuse into the particles of said other metal so as to form an alloy therewith, maintaining said temperature for sufficient time to reduce at least a portion of said oxide and to form an integral, porous, metallic skeleton bonded by said alloy, the temperature and time of said heating being insufficient to cause all of the catalytic metal of said oxide to alloy with said other metal and said temperature being insufficient to cause sintering of said other metal in the absence of said catalytic metal.

2. The method of making catalyst pellets which comprises, mixing finely divided, catalytically active, nickel oxide with finely divided iron, said iron being employed in an amount between approximately 40 and 60% by weight of the resultant mixture, compressing said mixture into pellets, heating said pellets in a reducing atmosphere to a temperature between approximately 550° and 575° C., maintaining said temperature for sufficient time to reduce at least a portion of said oxide and to cause metallic nickel to diffuse into particles of said iron and form an alloy therewith so as to form an integral, porous, metallic skeleton bonded by said alloy, and discontinuing said heating before all of the nickel of said oxide has been alloyed with said iron.

3. The method of making catalyst pellets which comprises, mixing finely divided, catalytically active, nickel oxide with finely divided copper, said copper being employed in an amount between approximately 40 and 60% by weight of the resultant mixture, compressing said mixture into pellets, heating said pellets in a reducing atmosphere to a temperature of approximately 750° C., maintaining said temperature for sufficient time to reduce at least a portion of said oxide and to cause metallic nickel to diffuse into particles of said copper and form an alloy therewith so as to form an integral, porous, metallic skeleton bonded by said alloy, and discontinuing said heating before all of the nickel of said oxide has been alloyed with said iron.

4. The method of making catalyst pellets which comprises, mixing finely divided, catalytically active, iron oxide with finely divided copper, said copper being employed in an amount between approximately 40 and 60% by weight of the resultant mixture, compressing said mixture into pellets, heating said pellets in a reducing atmosphere to a temperature of approximately 600° C., maintaining said temperature for sufficient time to reduce at least a portion of said oxide and to cause metallic iron to diffuse into particles of said copper and form an alloy therewith so as to form an integral, porous, metallic skeleton bonded by said alloy, and discontinuing said heating before all of the iron of said oxide has been alloyed with said copper.

LESLIE G. JENNESS.